(12) United States Patent
Karg et al.

(10) Patent No.: US 11,501,162 B2
(45) Date of Patent: Nov. 15, 2022

(54) DEVICE FOR CLASSIFYING DATA

(71) Applicant: Conti Temic microelectronic GmbH, Nuremberg (DE)

(72) Inventors: Michelle Karg, Lindau (DE); Christian Scharfenberger, Lindau (DE); Robert Thiel, Niederstaufen (DE)

(73) Assignee: CONTI TEMIC MICROELECTRONIC GMBH, Nuremberg (DE)

( * ) Notice: Subject to any disclaimer, the term of this patent is extended or adjusted under 35 U.S.C. 154(b) by 824 days.

(21) Appl. No.: 16/469,246

(22) PCT Filed: Dec. 8, 2017

(86) PCT No.: PCT/EP2017/082052
§ 371 (c)(1),
(2) Date: Jun. 13, 2019

(87) PCT Pub. No.: WO2018/108741
PCT Pub. Date: Jun. 21, 2018

(65) Prior Publication Data
US 2019/0354860 A1 Nov. 21, 2019

(30) Foreign Application Priority Data

Dec. 14, 2016 (EP) .................................... 16204089

(51) Int. Cl.
*G06N 3/08* (2006.01)
*B60Q 9/00* (2006.01)
(Continued)

(52) U.S. Cl.
CPC ................. *G06N 3/08* (2013.01); *B60Q 9/00* (2013.01); *G06K 9/628* (2013.01); *G06K 9/6215* (2013.01);
(Continued)

(58) Field of Classification Search
CPC . G06N 3/08; G06V 20/56; B60Q 9/00; G06K 9/6215; G06K 9/6219; G06K 9/6263; G06K 9/628
(Continued)

(56) References Cited

U.S. PATENT DOCUMENTS

| 2009/0232403 | A1* | 9/2009 | Waragai | .................. | G06N 20/00 |
| | | | | | 382/209 |
| 2019/0147322 | A1* | 5/2019 | Kim | .................. | G06F 17/18 |
| | | | | | 706/16 |
| 2021/0133623 | A1* | 5/2021 | Amrani | ................ | G06K 9/6259 |

OTHER PUBLICATIONS

International Search Report of the International Searching Authority for International Application PCT/EP2017/082052, dated Mar. 22, 2018, 2 pages, European Patent Office, HV Rijswijk, Netherlands.
(Continued)

*Primary Examiner* — Mark Roz
(74) *Attorney, Agent, or Firm* — RatnerPrestia

(57) ABSTRACT

A device is configured to classify data. Its operation involves providing (210) data samples including one or more of: image data, radar data, acoustic data, and/or lidar data to a processing unit. The data samples include at least one test sample, including positive samples and negative samples. Each positive sample has been determined to contain data relating to at least one object to be detected including at least one pedestrian, car, vehicle, truck or bicycle. Each negative sample has been determined not to contain data relating to the at least one object to be detected. These determinations regarding the positive samples and the negative samples are provided as input data, validated by a human operator, and/or provided by the device itself through a learning algorithm. A first plurality of groups is generated (220) by the processing unit implementing an artificial neural network, wherein at least some of the first plurality of groups are assigned a weighting factor. Each group of the first
(Continued)

plurality of groups is populated (230) by the processing unit implementing the artificial neural network with a different at least one of the plurality of negative samples based on a different feature of sample data similarity for each group, which involves processing the negative samples to determine a number of different features of sample data similarity in order to populate different groups with negative samples that share or substantially share that or a similar feature, wherein at least one of the groups of the first plurality of groups contains at least two negative samples. It is determined (240) by the processing unit implementing the artificial neural network whether the at least one test sample contains data relating to the at least one object based on the plurality of the positive samples and the first plurality of groups. The artificial neural network implements the learning algorithm.

11 Claims, 4 Drawing Sheets

(51) Int. Cl.
  *G06K 9/62* (2022.01)
  *G06V 20/56* (2022.01)
  *G06V 10/82* (2022.01)
(52) U.S. Cl.
  CPC ......... *G06K 9/6219* (2013.01); *G06K 9/6263* (2013.01); *G06V 20/56* (2022.01); *G06V 10/82* (2022.01)
(58) Field of Classification Search
  USPC .......................................................... 706/25
  See application file for complete search history.

(56) References Cited

OTHER PUBLICATIONS

PCT Written Opinion of the International Searching Authority for International Application PCT/EP2017/082052, dated Mar. 22, 2018, 8 pages, European Patent Office, HV Rijswijk, Netherlands.

PCT Written Opinion of the International Preliminary Examining Authority for International Application PCT/EP2017/082052, dated Nov. 28, 2018, 7 pages, European Patent Office, HV Rijswijk, Netherlands.

PCT International Preliminary Report on Patentability of the International Preliminary Examining Authority for International Application PCT/EP2017/082052, dated Feb. 4, 2019, 6 pages, European Patent Office, HV Rijswijk, Netherlands.

Extended European Search Report and Examination Report for European Patent Application No. 16204089.3, dated May 29, 2017, 6 pages, European Patent Office, Munich, Germany.

Ronaldo C. Prati et al., "Class Imbalance Revisited: a New Experimental Setup to Assess the Performance of Treatment Methods", Knowledge and Information Systems, vol. 45, No. 1, Oct. 17, 2014, XP035536837, ISSN: 0219-1377, DOI: 10.1007/S10115-014-0794-3, pp. 247 to 270.

George S. Sebestyen, "Decision-Making Processes in Pattern Recognition", Chapter 2 "Linear Methods in Classification and Learning", The Macmillan Company, 1962, XP002770184, pp. 8 to 24.

Richard O. Duda et al., "Pattern Classification", Second Edition, Chapter 9 "Algorithm-Independent Machine Learning", Section 9.5 "Resampling for Classifier Design", John Wiley and Sons, 2001, XP002770185, pp. 478 to 480.

\* cited by examiner

DEVICE FOR CLASSIFYING DATA

FIELD OF THE INVENTION

The present invention relates to a device configured to classify data, to a system for determining driving warning information, to a method for classifying data, as well as to a computer program element.

BACKGROUND OF THE INVENTION

The general background of this invention is the field of driving or driver warning systems. Present approaches in the domain of advanced driver assistance systems (ADAS) are increasingly using lifelong learning approaches, with systems being trained to improve detection and classification functionalities. Balanced data input is generally required within such a lifelong learning framework, which can lead to poor detection and classification.

SUMMARY OF THE INVENTION

It would be advantageous to have an improved device for classifying data.

The object of the present invention is solved with the subject matter of the independent claims, wherein further embodiments are incorporated in the dependent claims. It should be noted that the following described aspects and examples of the invention apply also for the device configured to classify data, the system for determining driving warning information, the method for classifying data, and for the computer program element.

In a first aspect, there is provided a device configured to classify data, comprising:
 an input unit; and
 a processing unit.

The input unit is configured to provide the processing unit with a plurality of data samples. The plurality of data samples comprises at least one test sample and comprises a plurality of positive samples and comprises a plurality of negative samples. Each of the positive samples has been determined to contain data relating to at least one object to be detected, and each of the negative samples has been determined not to contain data relating to at least one object to be detected. The processing unit is configured to generate a first plurality of groups. The processing unit is also configured to populate each group of the first plurality of groups with a different at least one of the plurality of negative samples. At least one of the groups of the first plurality of groups contains at least two negative samples. The processing unit is also configured to determine if the at least one test sample contains data relating to the at least one object on the basis of the plurality of the positive samples and the first plurality of groups.

In this manner, the normal situation where there are many more negative samples than positive samples is addressed, by an effect reducing the emphasis of the negative samples by populating a number of groups with the negative samples where the number of groups is less than the number of negative samples, and classifying a test sample as having an object or not on the basis of the positive samples and the groups, rather than on the basis of all the positive samples and all the negative samples. In other words, the effective positive and negative samples are balanced, by placing the negative samples (which generally far outnumber the positive samples) in groups.

The determination that the positive samples contain data relating to an object to be detected and the determination that the negative samples do not contain data relating to an object can be provided as input data, validated for example by a human operative, but also can be provided by the device itself through in effect the device utilising a self learning algorithm.

In an example, at least some of the first plurality of groups are assigned a weighting factor.

To put this another way, "each subcluster" or "group" is assigned an importance weight(s). In an example, the subclusters for each group are generated based on a distance metric. For example, this can be done manually. Importance weights are then assigned to each subcluster automatically. These weights can be re-adjusted to give critical subclasses higher importance during training. Such re-adjustment can be done manually. By assigning importance weights, large numbers of subclusters can be handled in this manner, rather than small numbers of subclusters as is used in the prior art, that are necessarily hand-designed.

In an example, the processing unit is configured to populate each group of the first plurality of groups on the basis of a different feature of sample data similarity for each group.

In other words, negative samples with a degree of similarity relating to a particular feature are grouped into a specific group, with other negative samples sharing a degree of similarity relating to a different particular feature are grouped into a different specific group. In this way, redundancy of information within the negative samples is taken into account, providing for an improved balancing of the positive and negative samples.

In an example, the processing unit is configured to determine a first plurality of representative samples for the first plurality of groups, wherein a different representative sample is associated with each group of the first plurality of groups; and wherein the processing unit is configured to determine if the at least one test sample contains data relating to the at least one object on the basis of the plurality of positive samples and the first plurality of representative samples.

In this manner, a balanced dataset can be provided comprising the positive samples and the representatives of each group of the negative samples, supporting classification to better balance data so that not too much emphasis is put on negative samples and/or specific negative samples with high redundancy in one group.

In other words, fine-grained balancing is considered for a large number of subclasses (and not only positive vs. negative, or class-based subclustering).

In an example, the processing unit is configured to generate a second plurality of groups. The processing unit is also configured to populate each group of the second plurality of groups with a different at least one of the plurality of positive samples, wherein at least one of the groups of the second plurality of groups contains at least two positive samples. The processing unit is also configured to determine if the at least one test sample contains data relating to the at least one object on the basis of the second plurality of groups and the first plurality of groups.

In this way, better balanced classification is provided, where not too much emphasis is placed on either the positive or negative samples.

In an example, at least some of the second plurality of groups are assigned a weighting factor.

In an example, the processing unit is configured to populate each group of the second plurality of groups on the basis of a different feature of sample data similarity for each group.

In this manner, redundancy of information within the positive samples is taken into account, providing for an improved balancing of the positive and negative samples.

In an example, the processing unit is configured to determine a second plurality of representative samples for the second plurality of groups, wherein a different representative sample is associated with each group of the second plurality of groups. The processing unit is also configured to determine if the at least one test sample contains data relating to the at least one object on the basis of the second plurality of representative samples and the first plurality of representative samples.

In this manner, a balanced dataset can be provided comprising the representatives of each group of the positive samples and the representatives of each group of the negative samples, supporting classification to better balance data so that not too much emphasis is put on positive samples and/or specific positive samples and not put on negative samples and/or specific negative samples.

In an example, the processing unit is configured to process the plurality of negative samples to determine a plurality of features of negative sample data similarity. The processing unit is also configured to populate each group of the first plurality of groups on the basis of a different feature of negative sample data similarity for each group. The processing unit is also configured to process the plurality of positive samples to determine a plurality of features of positive sample data similarity. The processing unit is also configured to process the at least one test sample to determine at least one representative feature. The determination if the at least one test sample contains data relating to the at least one object comprises a comparison of the at least one representative feature with the plurality of features of negative sample data similarity and the plurality of features of positive sample data similarity.

In an example, the processing unit is configured to process the plurality of negative samples to determine a plurality of features of negative sample data similarity. The processing unit is also configured to populate each group of the first plurality of groups on the basis of a different feature of negative sample data similarity for each group. The processing unit is also configured to process the plurality of positive samples to determine a plurality of features of positive sample data similarity. The processing unit is also configured to process a test sample of the at least one test sample to determine a test representative feature. The processing unit is also configured to add the test sample to the plurality of positive samples or add the test sample to the plurality of negative samples. The selective addition comprises a comparison of the test representative feature with the plurality of features of negative sample data similarity and the plurality of features of positive sample data similarity.

The determination that the negative samples do not contain data relating to an object can be provided by the device itself through in effect the device utilising a self learning algorithm.

In an example, if the processing unit determines that the test sample is to be added to the plurality of negative samples, the processing unit is configured to add the test sample to a group of the first plurality of groups based on a similarity metric satisfying a threshold condition.

In an example, if the processing unit determines that the test sample is to be added to the plurality of negative samples, the processing unit is configured to generate a new group of the first plurality of groups and add the test sample to the new group based on a similarity metric not satisfying a threshold condition.

In a second aspect, there is provided a system for determining driving or driver warning information, the system comprising:
 at least one data acquisition unit; and
 a device configured to classify data according to the first aspect; and
 an output unit.

The at least one data acquisition unit is configured to acquire the at least one test sample. The processing unit is configured to determine driver warning information on the basis of the determination if the at least one test sample contains data relating to the at least one object. The output unit is configured to output information indicative of the driver warning information.

In a third aspect, there is provided a method for classifying data, comprising:
a) providing a plurality of data samples, wherein the plurality of data samples comprises at least one test sample and comprises a plurality of positive samples and comprises a plurality of negative samples, and wherein, each of the positive samples has been determined to contain data relating to at least one object to be detected, and wherein each of the negative samples has been determined not to contain data relating to at least one object to be detected;
e) generating a first plurality of groups;
g) populating each group of the first plurality of groups with a different at least one of the plurality of negative samples, wherein at least one of the groups of the first plurality of groups contains at least two negative samples; and
m) determining if the at least one test sample contains data relating to the at least one object on the basis of the plurality of the positive samples and the first plurality of groups.

According to another aspect, there is provided a computer program element configured for controlling an apparatus as previously described which, when the computer program element is executed by a processing unit, is adapted to perform the method steps as previously described.

There is also provided a computer readable medium having stored thereon the computer program element as previously described.

Advantageously, the benefits provided by any of the above aspects equally apply to all of the other aspects and vice versa.

The above aspects and examples will become apparent from and be elucidated with reference to the embodiments described hereinafter.

BRIEF DESCRIPTION OF THE DRAWINGS

Exemplary embodiments will be described in the following with reference to the following drawings.

DETAILED DESCRIPTION OF EMBODIMENTS

Figure 1:
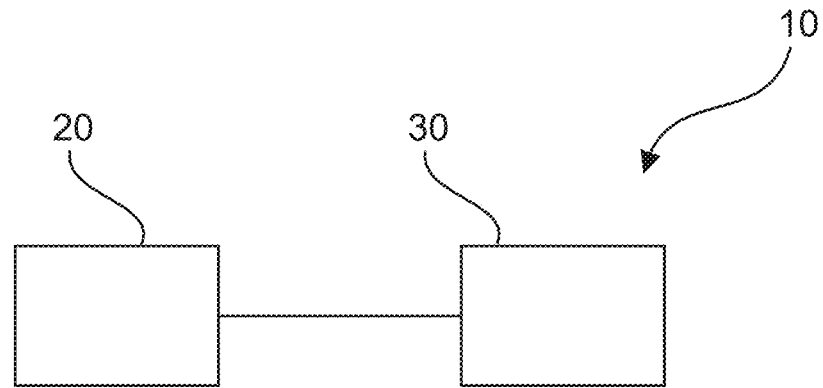
FIG. 1 shows a schematic set up of an example of a device configured to classify data.

FIG. 1 shows an example of a device 10 configured to classify data. The device comprises an input unit 20 and a processing unit 30. The input unit 20 is configured to provide the processing unit 30 with a plurality of data samples. The plurality of data samples comprises at least one test sample and comprises a plurality of positive samples and comprises a plurality of negative samples. Each of the positive samples has been determined to contain data relating to at least one object to be detected, and each of the negative samples has been determined not to contain data relating to at least one object to be detected. The processing unit is configured to generate a first plurality of groups. The processing unit is also configured to populate each group of the first plurality of groups with a different at least one of the plurality of negative samples, wherein at least one of the groups of the first plurality of groups contains at least two negative samples. The processing unit is also configured to determine if the at least one test sample contains data relating to the at least one object on the basis of the plurality of the positive samples and the first plurality of groups.

In an example, the determination if the at least one test sample contains data relating to the at least one object comprises the processing unit implementing an artificial neural network. In an example, the artificial neural network comprises a convolutional neural network.

In an example, the population of each group of the first plurality of groups comprises the processing unit implementing the artificial neural network, such as the convolutional neural network.

In an example, the generation of the first plurality of groups comprises the processing unit implementing the artificial neural network.

In an example, the artificial neural network comprises a learning algorithm. In this way, the artificial neural network is self-configurable by having a learning algorithm.

According to an example, at least some of the first plurality of groups are assigned a weighting factor.

In examples, the importance weights for each subcluster (or group) can be set: manually, e.g., highly critical subclusters are manually given high importance weights (during training samples of these subclusters can be drawn with greater probability); automatically using a statistical criterion, e.g., the number of samples in a subcluster; automatically using a relevance criterion, e.g., based on the classification score of the scores in the subcluster or on the mis-classification rate of the samples in a subcluster.

In an example, each group of the first plurality of groups can be assigned a different weighting factor.

In an example, the weighting factor for a group can be the number of samples in that group.

In an example, the weighting factor for a group can be the number manually assigned to that group.

In an example, the samples of the plurality of negative samples are each assigned a weighting factor that can be different for each sample. For example, negative samples that are different from other negative samples can be given an individual weighting factor. In other words, such a negative sample forms a group of one, for which there is a weighting factor (for the sample), without a group having to be generated as such. In this manner, when there are many more negative samples than positive samples, this imbalance can be addressed and can account for differences between the negative samples.

According to an example, the processing unit 30 is configured to populate each group of the first plurality of groups on the basis of a different feature of sample data similarity for each group.

In an example, the improved balance is achieved by weighting the samples, e.g., in continuously collected image data some highly similar samples have up to 100 instances or more, and others have only about 5-10 instances. Even though these samples are likely to be observed in the environment with the same probability, they have a different number of samples because, e.g., in one case the car is slow (more instances) and in the other case the car is faster (fewer instances). The present device addresses this imbalance through the weighting of samples.

In an example, the processing unit is configured to process the negative samples to determine a number of different features of sample data similarity in order to populate different groups with negative samples that share or substantially share that or a similar feature.

According to an example, the processing unit 30 is configured to determine a first plurality of representative samples for the first plurality of groups, wherein a different representative sample is associated with each group of the first plurality of groups. The processing unit is also configured to determine if the at least one test sample contains data relating to the at least one object on the basis of the plurality of positive samples and the first plurality of representative samples.

In an example, during training a fine-grained balancing mechanism is applied. The subclusters are drawn randomly based on the importance weights. Subclusters with higher importance weights are drawn more likely than subclusters with lower importance weights. All subclusters may have equal importance weights. In this case, the subclustering balances out the situation that some similar samples are included more often in the collected training set than other similar samples (e.g. samples collected from a slow or fast driving car). When a subcluster is drawn, a sample is drawn randomly from this subcluster. There is no additional balancing for the samples within each subcluster.

In comparison to the prior art, this approach proposes a fine-grained balancing for hundreds of subclasses. Prior art approaches only consider balancing for a small number of classes.

In an example, the determination of the first plurality of representative samples comprises the processing unit implementing the artificial neural network.

According to an example, the processing unit 30 is configured to generate a second plurality of groups. The processing unit is also configured to populate each group of the second plurality of groups with a different at least one of the plurality of positive samples, wherein at least one of the groups of the second plurality of groups contains at least two positive samples. The processing unit is also configured to determine if the at least one test sample contains data relating to the at least one object on the basis of the second plurality of groups and the first plurality of groups.

In an example, the generation of the second plurality of groups comprises the processing unit implementing the artificial neural network.

In an example, the population of each group of the second plurality of groups comprises the processing unit implementing the artificial neural network, such as the convolutional neural network.

According to an example, at least some of the second plurality of groups are assigned a weighting factor.

In an example, each group of the first plurality of groups can be assigned a different weighting factor.

In an example, the samples of the plurality of positive samples are each assigned a weighting factor, that can be different for each sample. For example, positive samples that are different from other positive samples can be given an individual weighting factor. In other words, such a positive sample forms a group of one, for which there is a weighting factor (for the sample) without a group having to be generated as such. In this manner, any imbalance can be addressed and can account for differences between the positive samples.

According to an example, the processing unit 30 is configured to populate each group of the second plurality of groups on the basis of a different feature of sample data similarity for each group.

In an example, the processing unit is configured to process the positive samples to determine a number of different features of sample data similarity in order to populate different groups with positive samples that share or substantially share that or a similar feature.

According to an example, the processing unit 30 is configured to determine a second plurality of representative samples for the second plurality of groups, wherein a different representative sample is associated with each group of the second plurality of groups. The processing unit is also configured to determine if the at least one test sample contains data relating to the at least one object on the basis of the second plurality of representative samples and the first plurality of representative samples.

In an example, the determination of the second plurality of representative samples comprises the processing unit implementing the artificial neural network.

According to an example, the processing unit 30 is configured to process the plurality of negative samples to determine a plurality of features of negative sample data similarity. The processing unit is also configured to populate each group of the first plurality of groups on the basis of a different feature of negative sample data similarity for each group; and the processing unit is configured to process the plurality of positive samples to determine a plurality of features of positive sample data similarity. The processing unit is also configured to process the at least one test sample to determine at least one representative feature. The determination if the at least one test sample contains data relating to the at least one object comprises a comparison of the at least one representative feature with the plurality of features of negative sample data similarity and the plurality of features of positive sample data similarity.

In an example, the processing of the plurality of negative samples to determine a plurality of features of negative sample data similarity comprises the processing unit implementing the artificial neural network.

In an example, the processing of the at least one test sample to determine the at least one representative feature comprises the processing unit implementing the artificial neural network.

According to an example, the processing unit 30 is configured to process the plurality of negative samples to determine a plurality of features of negative sample data similarity. The processing unit is also configured to populate each group of the first plurality of groups on the basis of a different feature of negative sample data similarity for each group; and the processing unit is configured to process the plurality of positive samples to determine a plurality of features of positive sample data similarity. The processing unit is also configured to process a test sample of the at least one test sample to determine a test representative feature. The processing unit is also configured to add the test sample to the plurality of positive samples or to the plurality of negative samples. The selective addition comprises a comparison of the test representative feature with the plurality of features of negative sample data similarity and the plurality of features of positive sample data similarity.

The determination that the negative samples do not contain data relating to an object to be detected can be provided by the device itself through, in effect, the device utilizing a self learning algorithm.

In an example, the adding of the test sample to the plurality of positive or negative samples comprises the processing unit implementing the artificial neural network.

According to an example, if the processing unit 30 determines that the test sample is to be added to the plurality of negative samples, the processing unit is configured to add the test sample to a group of the first plurality of groups based on a similarity metric satisfying a threshold condition.

According to an example, if the processing unit 30 determines that the test sample is to be added to the plurality of negative samples, the processing unit is configured to generate a new group of the first plurality of groups and add the test sample to the new group based on a similarity metric not satisfying a threshold condition.

In an example, if the processing unit determines that the test sample is to be added to the plurality of positive samples, the processing unit is configured to add the test sample to a group of the second plurality of groups based on the similarity metric satisfying a threshold condition.

The determination that the positive samples contain data relating to an object to be detected can be provided by the device itself through in effect the device utilising a self learning algorithm.

In an example, if the processing unit determines that the test sample is to be added to the plurality of positive samples, the processing unit is configured to generate a new group of the second plurality of groups and add the test sample to the new group based on a similarity metric not satisfying a threshold condition.

In an example, for "lifelong learning", new data will be continuously collected and the classifier will be retrained either online (on the car) or offline. To explain further, for this retraining, it is important to know the relevance of the sample. This relevance can be estimated by computing its similarity to the subcluster centers. When the similarity is below a threshold, a new subcluster is defined and an importance weight for this subcluster is computed.

The following provides a short summary: For continuous and lifelong learning of a function on a sensor device, the classifier is re-trained with newly collected data. The critical point is the judgment of the importance of newly collected data in an efficient manner regarding run-time and memory constraints. The proposed solution clusters the training data. Importance of newly collected samples is computed by the distance between the newly collected samples and the previously collected clusters. This reduces heavily the amount of data stored on the device and the computation time for distance computation since the entire dataset to compare against is reduced to the set of clusters. In addition, the clusters have semantic names and allow for a better interpretation.

In an example, in addition a subset of old data may be reused for retraining to guarantee the performance of the classifier on the original training dataset. Storing all training samples requires too much storage. Reducing automatically to a smaller set of training samples, here the centers of the subclusters, is highly relevant, and is addressed by the device and the algorithms it implements.

In an example, the plurality of data samples comprises one or more of: image data; radar data; acoustic data; and lidar data.

In an example, the image data is acquired by a camera. In an example, the radar data is captured by a radar system. In an example, the acoustic data is acquired by an acoustic sensor. In an example, the lidar data is acquired by a laser sensing system.

In an example, the plurality of data samples comprises magnetic resonance data. In an example, the plurality of data samples comprises X-ray image data. In an example, the plurality of data samples comprises X-ray Computer Tomography data. Thus in examples, image data can be acquired by one or more of: an MRI scanner; CT scanner; ultrasound sensor.

Figure 2:
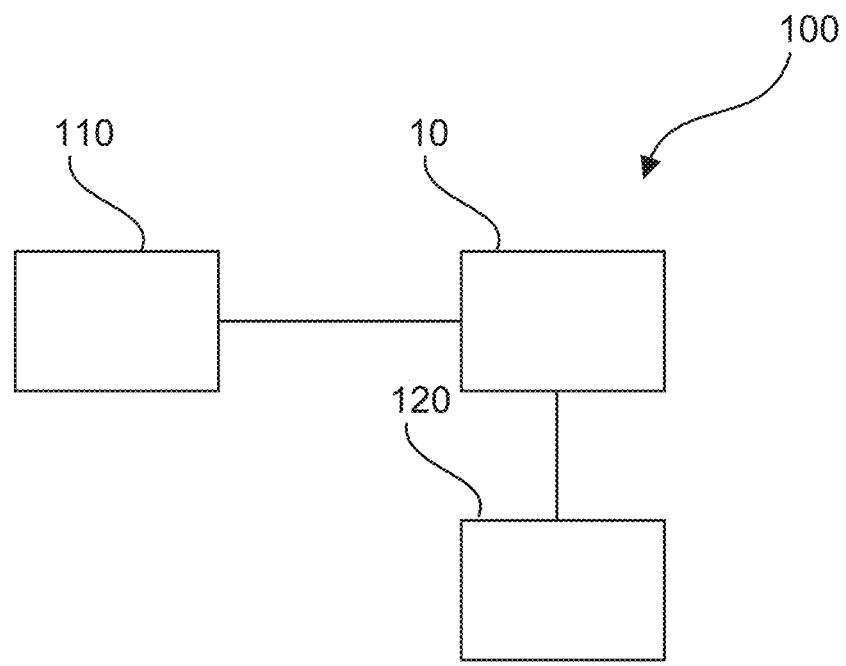
FIG. 2 shows a schematic set up of an example of a system for determining driving warning information.

FIG. 2 shows an example of a system 100 for determining driving warning information. The system 100 comprises at least one data acquisition unit 110 and a device 10 configured to classify data as described with respect to FIG. 1, and an output unit 120. The at least one data acquisition unit 110 is configured to acquire the at least one test sample. The processing unit 30 is configured to determine driver warning information on the basis of the determination if the at least one test sample contains data relating to the at least one object. The output unit 120 is configured to output information indicative of the driver warning information.

In an example, the input unit comprises the at least one data acquisition unit.

In an example, the at least one data acquisition unit comprises a camera.

In an example, the at least one data acquisition unit comprises a radar unit.

In an example, the at least one data acquisition unit comprises an acoustic sensor.

In an example, the at least one data acquisition unit comprises a lidar, laser based sensor.

In an example, the system is located in or on a vehicle, for example forming part of an Advanced Driver Assistance System ADAS.

Figure 3:
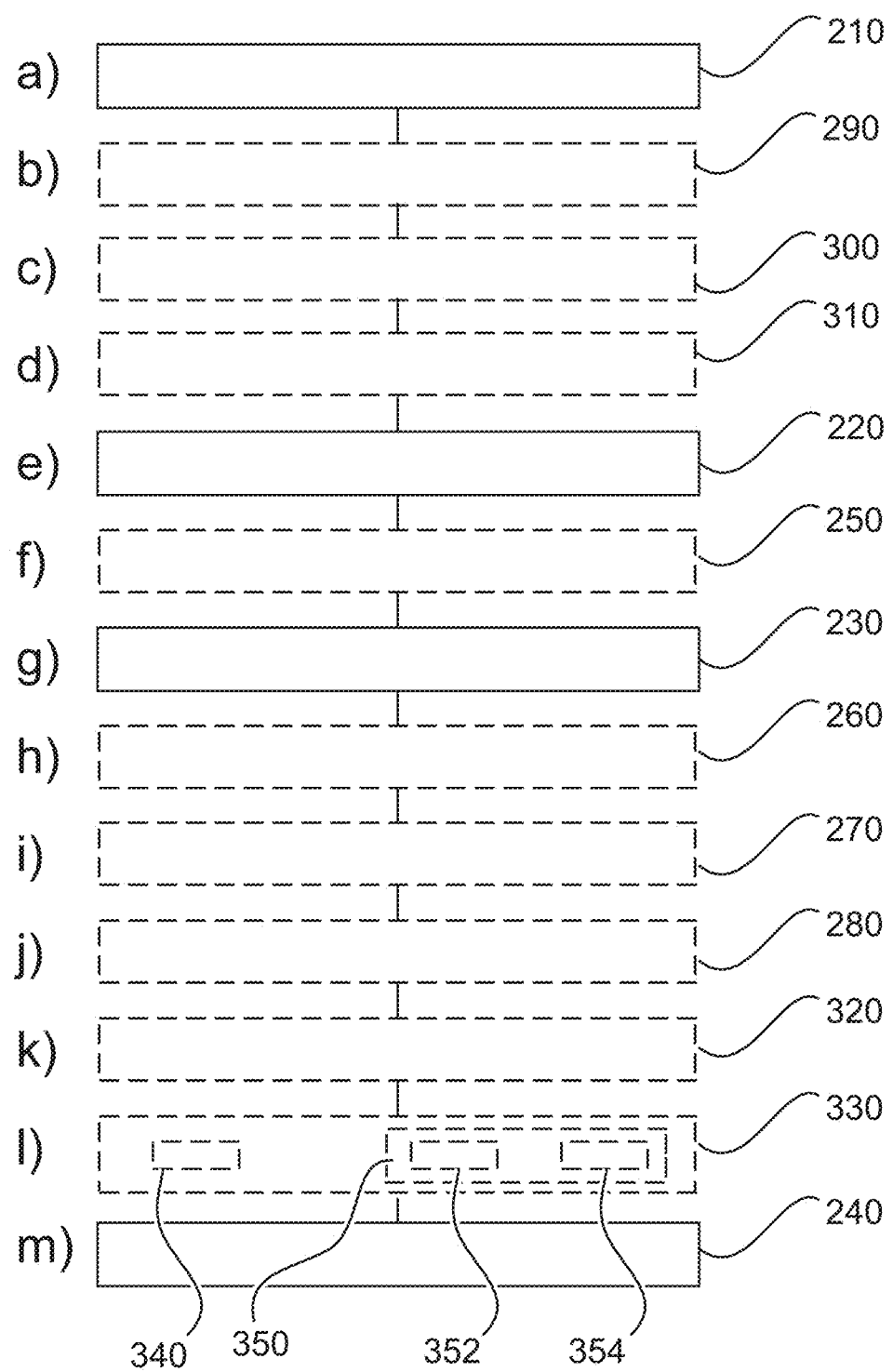
FIG. 3 shows a method for classifying data.

FIG. 3 shows a method 200 for classifying data in its basic steps. The method 200 comprises:

in a providing step 210, also referred to as step a), providing a plurality of data samples, wherein the plurality of data samples comprises at least one test sample and comprises a plurality of positive samples and comprises a plurality of negative samples, and wherein each of the positive samples has been determined to contain data relating to at least one object to be detected, and wherein each of the negative samples has been determined not to contain data relating to at least one object to be detected;

in a generating step 220, also referred to as step e), generating a first plurality of groups;

in a populating step 230, also referred to as step g), populating each group of the first plurality of groups with a different at least one of the plurality of negative samples, wherein at least one of the groups of the first plurality of groups contains at least two negative samples; and in a determining step 240, also referred to as step m), determining if the at least one test sample contains data relating to the at least one object on the basis of the plurality of the positive samples and the first plurality of groups.

In an example, step g) comprises populating each group of the first plurality of groups on the basis of a different feature of sample data similarity for each group.

In an example, the method comprises step f) determining 250 a first plurality of representative samples for the first plurality of groups, wherein a different representative sample is associated with each group of the first plurality of groups; and wherein step m) comprises determining if the at least one test sample contains data relating to the at least one object on the basis of the plurality of positive samples and the first plurality of representative samples.

In an example, the method comprises step h) generating 260 a second plurality of groups; and comprises step i) populating 270 each group of the second plurality of groups with a different at least one of the plurality of positive samples, wherein at least one of the groups of the second plurality of groups contains at least two positive samples; and wherein step m) comprises determining if the at least one test sample contains data relating to the at least one object on the basis of the second plurality of groups and the first plurality of groups.

In an example, step i) comprises populating each group of the second plurality of groups on the basis of a different feature of sample data similarity for each group.

In an example, the method comprises step j) determining 280 a second plurality of representative samples for the second plurality of groups, wherein a different representative sample is associated with each group of the second plurality of groups; and wherein step m) comprises determining if the at least one test sample contains data relating to the at least one object on the basis of the second plurality of representative samples and the first plurality of representative samples.

In an example, the method comprises step b) processing 290 the plurality of negative samples to determine a plurality of features of negative sample data similarity; and wherein step g) comprises populating each group of the first plurality of groups on the basis of a different feature of negative sample data similarity for each group; and wherein the method comprises step c) processing 300 the plurality of positive samples to determine a plurality of features of positive sample data similarity; and the method comprises step d) processing 310 the at least one test sample to determine at least one representative feature; and wherein step m) comprises a comparison of the at least one representative feature with the plurality of features of negative sample data similarity and the plurality of features of positive sample data similarity.

In an example, the method comprises step b) processing 290 the plurality of negative samples to determine a plurality of features of negative sample data similarity; and wherein step g) comprises populating each group of the first plurality of groups on the basis of a different feature of negative sample data similarity for each group; and wherein the method comprises step c) processing 300 the plurality of positive samples to determine a plurality of features of positive sample data similarity; and wherein the method comprises step k) processing 320 a test sample of the at least one test sample to determine a test representative feature; and wherein the method comprises step l) adding 330 in sub-step l1) 340 the test sample to the plurality of positive samples or adding in sub-step l2) 350 the test sample to the plurality of negative samples, the selective addition comprising a comparison of the test representative feature with the plurality of features of negative sample data similarity and the plurality of features of positive sample data similarity.

In an example, step l2) 350 comprises adding 352 the test sample to a group of the first plurality of groups based on a similarity metric satisfying a threshold condition.

In an example, step 12) 350 comprises generating 354 a new group of the first plurality of groups and adding the test sample to the new group based on a similarity metric not satisfying a threshold condition.

In an example, the plurality of data samples comprises one or more of: image data; radar data; acoustic data; and lidar data.

Figure 4:
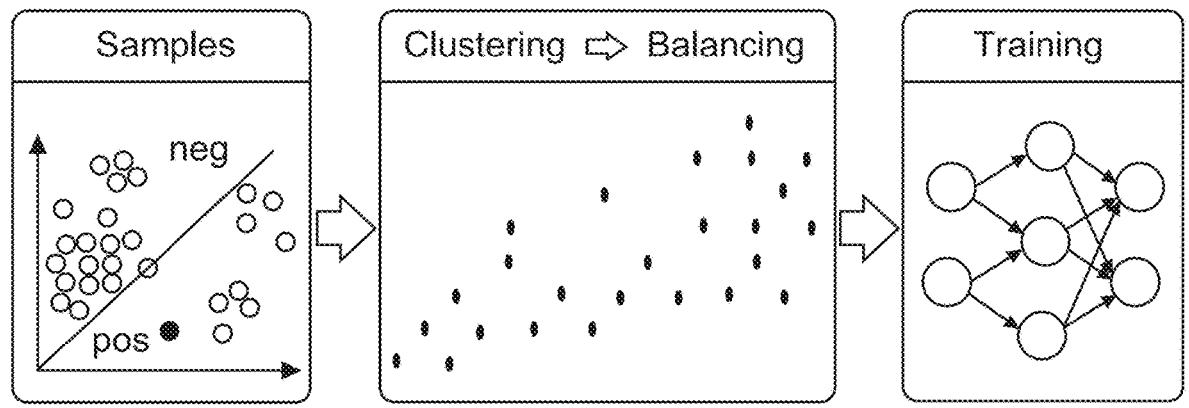
FIG. 4 shows the clustering of samples.
Figure 5:
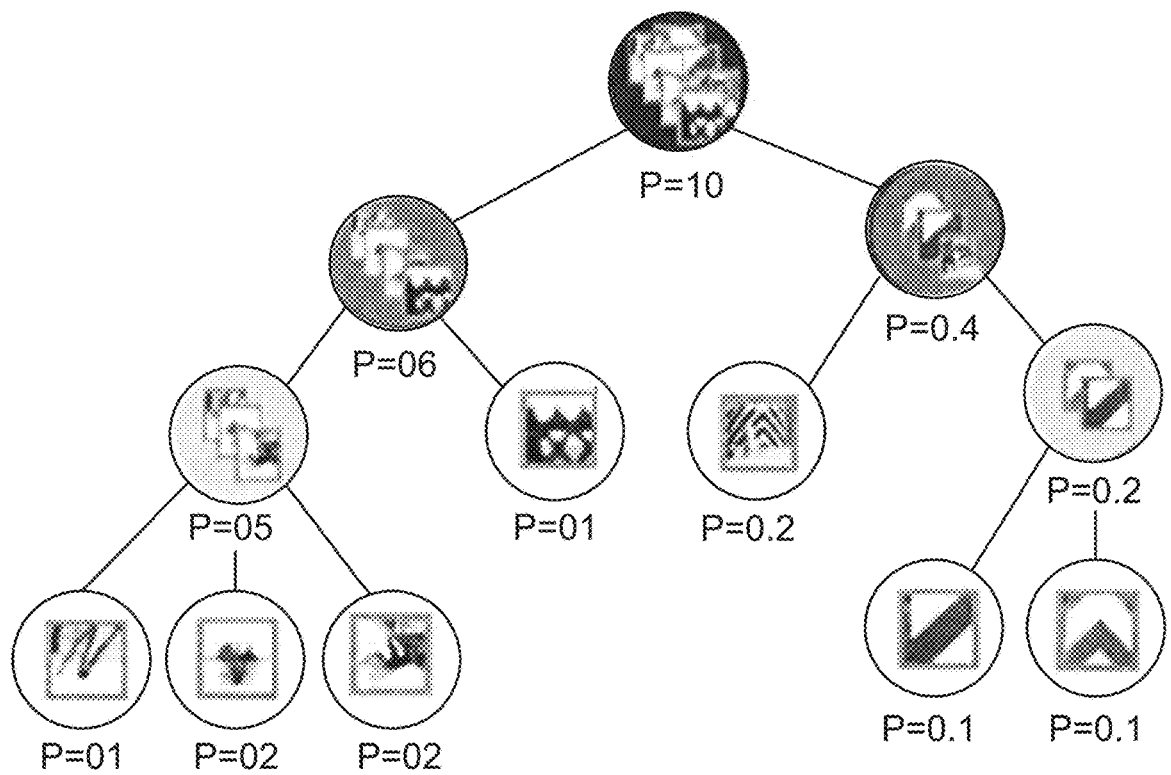
FIG. 5 shows clustering based on a hierarchical tree structure.
Figure 6:
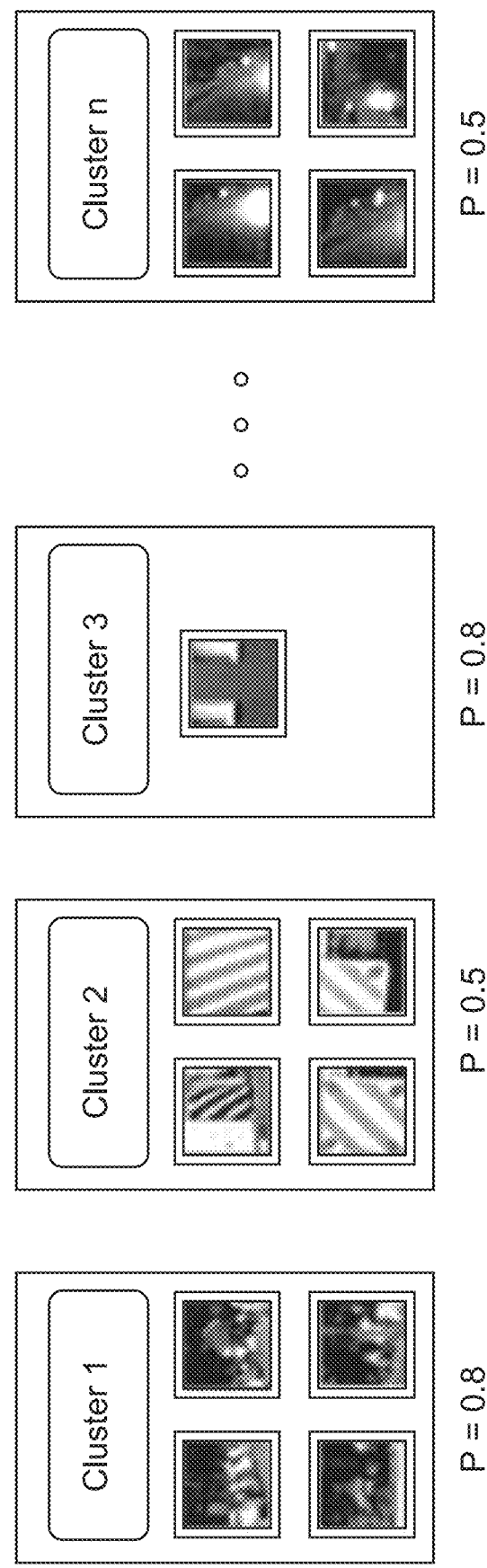
FIG. 6 shows clustering into n subclusters.

FIGS. 4-6 show examples of clustering of samples, as utilized within the device, system and method as described above in relation to FIGS. 1-3.

Approaches to lifelong learning that are for example applied in the domain of advanced driver assistance systems, are increasingly gaining importance. However, such lifelong learning techniques must be trained, and retrained. This can include training on the device continuously, in an online mode. This requires a training data to be stored on the device and extended by data continuously collected by the device during its lifetime. Convolutional neural networks (CNN) and other machine learning approaches can be utilized in this manner. These approaches, or techniques, require a dataset of positive and negative samples for determining the parameters/weights of the internal network structure. Determining such parameters based on such data is called training. The positive samples include objects to be detected, such as pedestrians, cars, vehicles, trucks or bicycles among others. The negative samples include background or background falsely classified as a valid detection/object. Machine learning approaches, such as utilizing CNNs, require balanced training datasets, containing a balanced (equal) number of positive and negative samples. However, training datasets for example for the automotive domain, that have been obtained from either off-line data or from data collected online with the device are often not balanced. Usually, the number of positive samples is small in comparison to the possible number of negative samples upon which the device can be trained. This results in CNNs with trained net-topologies and weights that overemphasize the importance of either positive samples or negative samples, leading to poor classification performance in general and/or to a decrease in performance of the device during its lifetime as it self learns through a lifelong learning approach. This problem is encountered not only in the automotive domain, but also in other domains or fields requiring the classification of data as described above.

The device, system and method described above in relation to FIGS. 1-3 address these issues, as described in more detail with respect to FIGS. 4-6.

As part of addressing these issues, a clustering approach is provided that balances the data prior to the online and/or off-line training of the machine learning approach on a device that utilizes for example a camera sensor, and provides for the ability to continuously provide lifelong training during online operation of the device. Data, or samples, can be in the form of camera imagery, processed camera imagery, radar data, processed radar data and other vehicular sensor information. In this the way there is provided:

1. better balancing of the number of positive samples and the number of negative samples in one dataset of training, wherein training can be off-line or online;
2. the explicit consideration of the redundancy of samples in one sample pool to better generalize the training of a machine learning approach; and
3. better consideration of the subclasses within one sample group.

The Clustering Approach

The clustering approach processes/clusters the samples in order to form groups of samples with high similarity within one group. Representatives of each group, within the positive/negative sample pools, can then be selected to form a balanced dataset for training a device. Thus, this clustering supports classification to better balance the data (e.g acquired samples in real time) so that not too much emphasis is put on either the positive or negative training group or specific samples with high redundancy in one group.

In addition, this clustering approach helps better consider the (few or very few) data samples of one sub-class within the sample groups from more balanced training of different classes within one sample group. Such samples may include critical false-positives and critical false-negatives, and may apply where collecting large sets of samples is often impractical.

In relation to a sensor device, and its continuous and lifelong learning, the classifier is retrained with newly collected data. Newly collected data is judged in terms of its importance, in an efficient manner with respect to processing runtime and memory constraints. The training data is clustered, and the importance of newly collected samples (data) is computed through the determination of the distance between the newly collected samples on the previously collected clusters. This heavily reduces the amount of data required to be stored on the device, and a computation time of the distance computation. This is because the dataset used for comparison is reduced to the set of clusters, rather than all the samples. In addition, the clusters have semantic names allowing for a better interpretation.

FIG. 4 shows an example of how samples are clustered to better balance the data of the training. The clustering approach processes/clusters samples in order to form groups of samples with high similarity within one group, so that representatives of each group within the positive/negative sample pools can be selected to form a balanced dataset for training purposes. This approach also enables samples acquired in real-time during operation of the device to be appropriately put into groups as part of a lifelong learning process for the device.

With continued reference to FIG. 4, on the left a collection of samples in the feature space is shown (for illustration purposes, a two-dimensional feature space is shown). This collection can be subdivided into classes, e.g., positive and negative classes. Furthermore, the samples of each class can be further subdivided into subclasses, shown in the middle. Each subclass can have a different number of samples, with a minimum of 1 sample per subclass. In addition, each subclass can have an importance value. In the training, shown on the right, samples can be drawn more often from subclasses with high importance values. Hence, critical samples can be represented by subclasses with high importance values. Therefore, this form of balancing is not based on manually preselecting sub-datasets that are weighted more or less during the training procedure, instead the subclasses are automatically generated and importance values can be either automatically generated or manually set for critical samples.

A detailed workflow is now described regarding how clustering is performed:

1. Cluster the sample pool (e.g. positive or negative sample pool)

Compute a feature representation from the raw sample, such as an input image. A semantic hash of the feature representation can also be computed, which can provide speed advantages;

Define a similarity metric for a vector-based feature representation. This distance can be computed based on a Hamming distance for semantic hashes, or Euclidean distance amongst others;

Define a threshold for the similarity metric;

Cluster the samples by either a bottom-up or top-down clustering approach, or a combination of bottom-up and top-down clustering approach;

For clustering in a bottom-up approach:

Compare the semantic hash of the feature with the hashes of the cluster centers based on the similarity metric:

If the similarity is sufficiently large in relation to one of the cluster centers, then the sample is assigned to that cluster and the cluster centre center is recomputed, for example:

For Euclidean distances, the cluster centre is redefined by iteratively updating the mean;

For Hamming distances, the sample is found that is closest to all other samples in the cluster and the hash of that sample is used as the new cluster center;

If the similarity is below the threshold, then generate a new cluster with the feature representation or the hash of the sample as the cluster center;

The cluster analysis can additionally be used for visual inspection of the data, in particular, to group false positives and false negatives.

2. Define probabilities of all clusters, relating to how likely samples from such clusters will be drawn:

The probability distribution of all clusters follows a uniform distribution in a default setup;

based on importance, some clusters can be assigned higher probability because they are considered to be more relevant, for example critical negative or critical positive samples.

3. Integration of Integrate the sample selection scheme into the training algorithm:

First, clusters are drawn randomly from the set of clusters based on the defined cluster probabilities;

Secondly, random samples are drawn from each cluster selected in the first step.

Complementing the above workflow, each cluster can be extended by samples. Such samples used to extend clusters can be synthetically generated, borrowed from other datasets, or collected in additional data recordings. This enables sharing of different information collected by different devices/sensors online. In addition, it simplifies concatenating information collected by different devices/sensors based on clustering approaches. The above described clustering approach, and workflow, can then be used in a lifelong learning approach where online data acquired for example by a device forms part of the training dataset for improvement of the device. Furthermore, the way by which data is classified for incorporation into particular groups or clusters or subclusters enables acquired data, for example from a camera forming part of an ADAS system, to be analyzed and classified in terms of the content within the image. In other words, the device can determine if an image contains features such as pedestrians, other cars, road signs et cetera, or if the image does not indeed contain such data.

FIG. 5 shows a clustering approach which is different from that discussed above and shown in FIG. 4, and which is based on a hierarchical clustering tree. In summary, the steps are:

1. Trust the samples of each sample group, and build a hierarchical cluster tree;
2. Visualize the cluster centres, centers; and
3. Assign weights to the cluster centres centers used for the training.

With continued reference to FIG. 5, and in more detail, the output of a sample clustering mechanism based on a hierarchical tree is illustrated. The steps for automatically generating the subclusters are the following: 1) automatically build a hierarchical cluster tree using distance metrics between the samples, 2) optionally visualize the cluster centers. This supports a manual investigation of the training data, e.g., a search for mis-labeled data or a manual search for critical samples. In addition, this provides a compact representation of the training data on which the algorithm is based, and 3) assign importance weights to the cluster centers to control the learning classifiers. Again, such a clustering mechanism can be used in off-line and online training, and for real-time operation of the device for example in an ADAS.

The assigning of weights to the subclusters (groups) that applies across the approaches is shown in FIG. 6. This figure illustrates the importance weights of the subclusters. When there are n subclusters, each subcluster has an importance weight. Importance weights are assigned to each subcluster automatically. In addition, importance weights can be adjusted manually based on criteria, such as priority or critical false positives. These importance weights are not necessarily based on the frequency of the samples in the subset. The importance weights determine how likely samples of a subcluster are drawn during training. Samples from subclusters with high importance weights are drawn more often than samples from clusters with low importance weights.

Sampling Strategy

During training a fine-grained balancing mechanism is applied. The subclusters are drawn randomly based on the importance weights. Subclusters with higher importance weights are drawn more likely than subclusters with lower importance weights. All subclusters may have equal importance weights. In this case, the subclustering balances out the situation that some similar samples are present more often in the collected training set than other similar samples (e.g. samples collected from a slow or fast driving car). When a subcluster is drawn, a sample from this subcluster is drawn randomly. There is no additional balancing for the samples within each subcluster.

In comparison to the prior art, this approach proposes a fine-grained balancing for hundreds of subclasses. Prior art approaches only consider balancing for a small number of classes.

The above described device, system and method which make use of one or other of the above described clustering approaches, address the issue of an imbalance in the data that is provided to the device for training and lifelong learning processes. This also provides the device, system and method with an efficient way of processing real-time data to determine if imagery contains features of importance, such as whether or not pedestrians are present. This is achieved through the consideration of redundant and multiply appearing samples, which are then clustered, taking into account samples that can occur more often in one sample pool and others. This also addresses the specific case within the vehicular domain, where a huge number of redundant negative samples extracted from images recorded by a slow-moving vehicle can be obtained, as opposed to very few, nonredundant samples recorded by a fast driving vehicle. For example, some negative samples can have hundreds of repetitions in a dataset, whereas others are less frequently observed. The currently described device, system and method address this, ensuring that greater emphasis is not provided to more frequent samples, providing for a general improvement in classification performance. In other words, the device, system and method provide an approach to lifelong learning, online training, and processing of real time data that:
1. Balances positive and negative samples;
2. Considers redundancy of samples within one sample pool by grouping the samples of high similarity;
3. Explicitly allows for the consideration of subclasses with very few samples within one pool; and
4. Provides an efficient way to compute the weights of newly collected samples (online and in real time) for retraining as part of lifelong learning, and real-time utilization of the device, using the reduced number of clusters instead of having to rely on entire datasets.

The device, system and method are described with respect to the automotive sector and the provision of warning information. However, the device, system and method are applicable to any other field where data is required to be classified, and utilized within a machine learning environment. This includes biomedical image processing, such as within the Magnetic Resonance, Computer Tomography, or ultrasound domains, as well as to aerial image processing and synthetic aperture radar image processing. Particularly, the device, system and method can:
1. Optimize data management for learning classifiers, e.g. the selection of samples including negative samples that differ from the collected negative sample pool and are, hence, highly relevant for training;
2. Visualize the different sample types within the sample pool. This can be useful to obtain a better understanding of the distribution of data/samples within a dataset;
3. Balance newly collected negative or positive samples, and distinguish between highly relevant and redundant data compared with previously collected data;
4. Apply to continuous learning approaches, that consistently collect data for extending their knowledge/data of the machine learning approach used over their lifetime;
5. Enhance some clusters by introducing a "forgetting-factor" to other, less important clusters in the case of continuous learning;
6. Compactly represent data being used for training and used for analysis in real-time, mitigating the requirement to store large datasets and/or minimizing the data required to be analyzed through the selection of representative samples for groups (or subsets or clusters or subclusters) that exhibit a certain degree of similarity;
7. Operate on embedded systems, providing budget advantages because less memory is required when adding new knowledge/data to the overall system during continuous/lifelong learning for example during real time operation in the field.

In another exemplary embodiment, a computer program or computer program element is provided that is characterized by being configured to execute the method steps of the method according to one of the preceding embodiments, on an appropriate system.

The computer program element might therefore be stored on a computer unit, which might also be part of an embodiment. This computing unit may be configured to perform or induce performing of the steps of the method described above. Moreover, it may be configured to operate the components of the above described apparatus and/or system. The computing unit can be configured to operate automatically and/or to execute the orders of a user. A computer program may be loaded into a working memory of a data processor. The data processor may thus be equipped to carry out the method according to one of the preceding embodiments.

According to a further exemplary embodiment of the present invention, a computer readable medium, such as a CD-ROM, is presented wherein the computer readable medium has a computer program element stored on it which computer program element is described by the preceding section.

It has to be noted that embodiments of the invention are described with reference to different subject matters. In particular, some embodiments are described with reference to method type claims whereas other embodiments are described with reference to device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergistic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference characters in the claims should not be construed as limiting the scope of the claims.

The invention claimed is:

1. A device (10) configured to classify data for determining driver warning information, comprising:
an input unit (20); and
a processing unit (30);
wherein the input unit is configured to provide, to the processing unit, data samples comprising at least one of image data, radar data, acoustic data and/or lidar data obtained from a vehicle, wherein the data samples include at least one test sample including a plurality of positive samples and a plurality of negative samples, wherein a total number of the negative samples is significantly larger than a total number of the positive samples, wherein the plurality of negative samples includes a plurality of redundant samples with high similarity, wherein each one of the positive samples has been determined to contain data relating to at least one object to be detected including at least one pedestrian, car, vehicle, truck or bicycle, wherein each one of the negative samples has been determined not to contain data relating to the at least one object to be detected, and wherein the determination that the positive samples contain data relating to the at least one object to be detected and the determination that the negative samples do not contain data relating to the at least one object to be detected are provided as input data, validated by a human operator, and/or provided by the device through utilization of a learning algorithm;

wherein the processing unit (30) is configured to process the plurality of negative samples to determine a plurality of features of negative sample data similarity, and wherein the processing unit is configured to process the plurality of positive samples to determine a plurality of features of positive sample data similarity;

wherein the processing unit is configured to implement an artificial neural network to generate a first plurality of groups, wherein each one of the first plurality of groups is respectively assigned an importance weight or weighting factor, wherein during training a fine-grained balancing mechanism is applied with a respective group of the first plurality of groups being drawn based on the importance weight or weighting factor thereof, wherein when the respective group is drawn a sample from the respective group is drawn randomly, and wherein during the training a manual adjustment of the importance weights or weighting factors is performed to give higher importance to critical ones of the groups;

wherein the processing unit (30) is configured to determine a first plurality of representative samples for the first plurality of groups, wherein a different one of the representative samples is respectively associated with each respective group of the first plurality of groups;

wherein the processing unit is configured to implement the artificial neural network to populate each group of the first plurality of groups with a different at least one of the plurality of negative samples based on a different feature of sample data similarity for each one of the groups, wherein the processing unit is configured to process the negative samples to determine a number of different features of sample data similarity in order to populate different ones of the groups with ones of the negative samples that share or substantially share that feature or a similar feature, wherein at least one of the groups of the first plurality of groups contains at least two of the negative samples, and wherein the processing unit is configured to populate each group of the first plurality of groups based on a different feature of negative sample data similarity for each one of the groups;

wherein the processing unit is configured to process a test sample of the at least one test sample to determine a test representative feature;

wherein the processing unit is configured to perform a selective addition that involves adding the test sample to the plurality of positive samples or adding the test sample to the plurality of negative samples, wherein the selective addition comprises a comparison of the test representative feature with the plurality of features of negative sample data similarity and the plurality of features of positive sample data similarity;

wherein the processing unit is configured to implement the artificial neural network to determine whether the at least one test sample contains the data relating to the at least one object based on the plurality of the positive samples and the first plurality of the representative samples; and wherein the artificial neural network comprises the learning algorithm.

2. The device according to claim 1, wherein the processing unit (30) is configured to generate a second plurality of groups, wherein the processing unit is configured to populate each group of the second plurality of groups with a different at least one of the plurality of positive samples, wherein at least one of the groups of the second plurality of groups contains at least two of the positive samples, and wherein the processing unit is configured to determine whether the at least one test sample contains the data relating to the at least one object based on the second plurality of groups and the first plurality of groups.

3. The device according to claim 2, wherein at least some groups of the second plurality of groups are respectively assigned a respective weighting factor.

4. The device according to claim 2, wherein the processing unit (30) is configured to populate each group of the second plurality of groups based on a different feature of sample data similarity for each group.

5. The device according to claim 2, wherein the processing unit (30) is configured to determine a second plurality of representative samples for the second plurality of groups, wherein a different representative sample is associated with each group of the second plurality of groups, and wherein the processing unit is configured to determine whether the at least one test sample contains the data relating to the at least one object based on the second plurality of representative samples and the first plurality of representative samples.

6. The device according to claim 1, wherein the processing unit (30) is configured to process the plurality of negative samples to determine a plurality of features of negative sample data similarity, wherein the processing unit is configured to populate each group of the first plurality of groups based on a different feature of negative sample data similarity for each group, wherein the processing unit is configured to process the plurality of positive samples to determine a plurality of features of positive sample data similarity, wherein the processing unit is configured to process the at least one test sample to determine at least one representative feature, and wherein the determination whether the at least one test sample contains the data relating to the at least one object comprises a comparison of the at least one representative feature with the plurality of features of negative sample data similarity and the plurality of features of positive sample data similarity.

7. The device according to claim 1, wherein, when the processing unit (30) determines that the test sample is to be added to the plurality of negative samples, the processing unit is configured to add the test sample to a group of the first plurality of groups based on a similarity metric satisfying a threshold condition.

8. The device according to claim 1, wherein, when the processing unit (30) determines that the test sample is to be added to the plurality of negative samples, the processing unit is configured to generate a new group of the first plurality of groups and add the test sample to the new group based on a similarity metric not satisfying a threshold condition.

9. A system (100) for determining driver warning information, the system comprising:
 at least one data acquisition unit (110);
 a device (10) according to claim 1 configured to classify data; and
 an output unit (120);
 wherein the at least one data acquisition unit is configured to acquire the at least one test sample;
 wherein the processing unit (30) is configured to determine the driver warning information based on the determination whether the at least one test sample contains the data relating to the at least one object; and
 wherein the output unit is configured to output information indicative of the driver warning information.

10. A method (200) of classifying data for determining driver warning information, comprising:
  a) providing (210), to a processing unit, data samples comprising at least one of image data, radar data, acoustic data and/or lidar data obtained from a vehicle, wherein the data samples include at least one test sample including a plurality of positive samples and a plurality of negative samples, wherein a total number of the negative samples is significantly larger than a total number of the positive samples, wherein the plurality of negative samples includes a plurality of redundant samples with high similarity, wherein each one of the positive samples has been determined to contain data relating to at least one object to be detected including at least one pedestrian, car, vehicle, truck or bicycle, wherein each one of the negative samples has been determined not to contain data relating to the at least one object to be detected, and wherein the determination that the positive samples contain data relating to the at least one object to be detected and the determination that the negative samples do not contain data relating to the at least one object to be detected are provided as input data, validated by a human operator, and/or provided by the device through utilization of a learning algorithm;
  b) processing (290) the plurality of negative samples to determine a plurality of features of negative sample data similarity;
  c) processing (300) the plurality of positive samples to determine a plurality of features of positive sample data similarity;
  e) generating (220), by the processing unit implementing an artificial neural network, a first plurality of groups, wherein each one of the first plurality of groups is respectively assigned an importance weight or weighting factor, wherein during training a fine-grained balancing mechanism is applied with a respective group of the first plurality of groups being drawn based on the importance weight or weighting factor thereof, wherein when the respective group is drawn a sample from the respective group is drawn randomly, and wherein during the training a manual adjustment of the importance weights or weighting factors is performed to give higher importance to critical ones of the groups;
  f) determining (250) a first plurality of representative samples for the first plurality of groups, wherein a different one of the representative samples is respectively associated with each respective group of the first plurality of groups;
  g) populating (230), by the processing unit implementing the artificial neural network, each group of the first plurality of groups with a different at least one of the plurality of negative samples based on a different feature of sample data similarity for each one of the groups, comprising processing the negative samples to determine a number of different features of sample data similarity in order to populate different ones of the groups with negative samples that share or substantially share that feature or a similar feature, wherein at least one of the groups of the first plurality of groups contains at least two of the negative samples, and populating each group of the first plurality of groups based on a different feature of negative sample data similarity for each one of the groups;
  k) processing (320) a test sample of the at least one test sample to determine a test representative feature;
  l) performing a selective addition that involves adding (330), in a sub-step l1) (340), the test sample to the plurality of positive samples, or adding, in a sub-step l2) (350), the test sample to the plurality of negative samples, wherein the selective addition comprises a comparison of the test representative feature with the plurality of features of negative sample data similarity and the plurality of features of positive sample data similarity; and
  m) determining (240), by the processing unit implementing the artificial neural network, whether the at least one test sample contains the data relating to the at least one object based on the plurality of the positive samples and the first plurality of the representative samples,
  wherein the artificial neural network comprises the learning algorithm.

11. A computer program element configured to carry out the method according to claim 10, when the computer program element is executed by a processor.

* * * * *